(12) United States Patent
Vancho

(10) Patent No.: US 11,714,207 B2
(45) Date of Patent: Aug. 1, 2023

(54) SEISMIC EVENT DETECTION SYSTEM

(71) Applicant: View, Inc., Milpitas, CA (US)

(72) Inventor: Vince Vancho, Dove Canyon, CA (US)

(73) Assignee: View, Inc., Milpitas, CA (US)

( * ) Notice: Subject to any disclaimer, the term of this patent is extended or adjusted under 35 U.S.C. 154(b) by 1014 days.

(21) Appl. No.: 16/488,137

(22) PCT Filed: Feb. 21, 2018

(86) PCT No.: PCT/US2018/019027
§ 371 (c)(1),
(2) Date: Aug. 22, 2019

(87) PCT Pub. No.: WO2018/156636
PCT Pub. Date: Aug. 30, 2018

(65) Prior Publication Data
US 2020/0003918 A1 Jan. 2, 2020

Related U.S. Application Data

(60) Provisional application No. 62/462,152, filed on Feb. 22, 2017.

(51) Int. Cl.
*G01V 1/00* (2006.01)
*G08B 21/10* (2006.01)

(52) U.S. Cl.
CPC .............. *G01V 1/008* (2013.01); *G01V 1/003* (2013.01); *G08B 21/10* (2013.01); *G01V 2210/1232* (2013.01); *G01V 2210/6161* (2013.01)

(58) Field of Classification Search
CPC .................. G01V 1/008; G01V 1/003; G01V 2210/1232; G01V 2210/6161; G08B 21/10
See application file for complete search history.

(56) References Cited

U.S. PATENT DOCUMENTS

| 4,359,722 A | 11/1982 | Valdez et al. |
| 4,528,559 A | 7/1985 | Freeman |

(Continued)

FOREIGN PATENT DOCUMENTS

| CN | 1685377 A | 10/2005 |
| CN | 105143586 A | 12/2015 |

(Continued)

OTHER PUBLICATIONS

National Geographic, "How Do Earthquake Early Warning Systems Work," (Sep. 2013) [http://news.nationalgeographic.com/news/2013/09/130927-earthquake-early-warning-system-earth-science/].

(Continued)

*Primary Examiner* — Elias Desta
(74) *Attorney, Agent, or Firm* — Weaver Austin Villeneuve & Sampson LLP; Brian D. Griedel

(57) ABSTRACT

Various embodiments herein relate to systems and methods for detecting seismic events. Systems may include inertial sensors distributed on or in communication with a network of optically switchable windows in the building. In some systems, inertial sensors are located within a window controller, within an insulated glass unit, or in some way rigidly attached to the structure of a building. Logic is described for leveraging sensed inertial data to predicted a seismic event and/or evaluate the structural health of the building. In some cases, logic may be used to issue an alert to building occupants about impending shear waves that will arrive at the building's location. In some cases, a window network may respond to a detected seismic event by, e.g., changing the optical state of windows and/or providing occupants with evacuation instructions.

28 Claims, 7 Drawing Sheets

(56) References Cited

U.S. PATENT DOCUMENTS

| | | | |
|---|---|---|---|
| 5,001,466 | A | 3/1991 | Orlinsky et al. |
| 7,598,884 | B2 | 10/2009 | Lachenit et al. |
| 7,693,663 | B2 * | 4/2010 | Friedlander ............ G01V 1/008 340/690 |
| 9,267,862 | B1 | 2/2016 | Kavars et al. |
| 10,677,944 | B2 * | 6/2020 | Jackson ................ G01V 1/008 |
| 2011/0235152 | A1 | 9/2011 | Letocart |
| 2012/0293855 | A1 | 11/2012 | Shrivastava et al. |
| 2014/0236323 | A1 | 8/2014 | Brown et al. |

FOREIGN PATENT DOCUMENTS

| | | |
|---|---|---|
| JP | S6384785 A | 4/1988 |
| JP | H026397 U | 1/1990 |
| JP | 2005537484 A | 12/2005 |
| JP | 2007198813 A | 8/2007 |
| JP | 2009512977 A | 3/2009 |
| JP | 2009521977 A | 6/2009 |
| JP | 2013515457 A | 5/2013 |
| JP | 2016516921 A | 6/2016 |
| JP | 2018142227 A | 9/2018 |
| KR | 20150133728 A | 11/2015 |
| KR | 20170075534 A | 7/2017 |
| WO | WO-2004021298 A2 | 3/2004 |
| WO | WO-2011087726 A2 | 7/2011 |
| WO | WO-2014130471 A1 | 8/2014 |
| WO | WO-2015171886 A1 | 11/2015 |
| WO | WO-2017047070 A1 | 3/2017 |

OTHER PUBLICATIONS

National Instruments, "Measuring Vibration with Accelerometers," (Mar. 14, 2019) [http://www.ni.com/white-paper/3807/en/].

NBC Bay Area, "New Findings at California Earthquake Conference Ignite Push for Early-Warning System," (May 5, 2016) [http://www.nbcbayarea.com/news/local/New-Findings-at-California-Earthquake-Conference-Ignite-Push-for-Early-Warning-System-378368921.html].

NCBI, "Citizen Sensors for SHM: Use of Accelerometer Data from Smartphones," (2015) [https://www.ncbi.nlm.nih.gov/pmc/articles/PMC4367344/].

NSF, "Collaborative Research: CDI-Type II: From Data to Knowledge: The Quake-Catcher Network," (Sep. 24, 2010-Jun. 22, 2011) [http://nsf.gov/awardsearch/showAward?AWD_ID=1027913].

Physical Logic, "Seismic Sensing," (Undated) [http://physical-logic.com/applications/seismic-sensing/].

Physical Logic, "MAXL-OL-2002," (Undated) [http://physical-logic.com/products/maxl-ol-2002/].

QCN, "The Quake Catcher Network," (Jul. 2016) [http://quakecatcher.net/].

Sensor—MEMS Sensor for Seismic by Colibrys, (2022) [https://www.colibrys.com/pro-cats/seismic-sensors/].

ShakeAlert, "ShakeAlert: An Earthquake Early Warning System for the West Coast of the United States," (2019) [http://www.shakealert.org/].

USGS, "Animals & Earthquake Prediction," (undated) [http://earthquake.usgs.gov/learn/topics/animal_eqs.php].

CISN, "Earthquake Early Warning," (undated) [http://www.cisn.org/eew/].

Earth Science Beta, "Characterizing earthquakes using accelerometer data," (Apr. 2015) [http://earthscience.stackexchange.com/questions/4681/characterizing-earthquakes-using-accelerometer-data].

Earth Science Laboratory, "How Can You Locate the Epicenter of an Earthquake?" (undated) [http://www.oakton.edu/user/4/billtong/eas100lab/lab10quake.htm].

Facebook, "Inventors' Corner: U.S. Pat. No. 7,693,663—System and method for detection of earthquakes and tsunamis, and interface to war . . . " (Jul. 28, 20100 [https://www.facebook.com/notes/ibm-research/inventors-corner-us-patent-7693663-system-and-method-for-detection-of-earthquake/10150232358020254/].

hp.com, "HP MEMS Seismic Sensor for Oil and Gas Exploration," (undated) [http://www.hp.com/hpinfo/newsroom/press_kits/2011/sensingsolutions/HP_Seismic_Sensor_wp.pdf].

I Programmer, "IBM inventors patent earthquake detection system," (Oct. 28, 2010) [http://www.i-programmer.info/news/99-professional/1499-ibm-inventors-patent-earthquake-detection-system.html].

Live Science, "Earthquake Detection: Smartphone Tech Could Improve Response," (Sep. 29, 2013) [http://www.livescience.com/40032-earthquake-detection-smartphone-mems-sensors.html].

Los Angeles Times, Quake early warning system could save lives. But it's stalled over money dispute, (Feb. 4, 2016) [http://www.latimes.com/science/la-me-earthquakes-early-warning-20160204-story.html].

MichiganTech, "UPSeis an educational site for budding seismologists," (undated) [http://www.geo.mtu.edu/UPSeis/waves.html].

NBCI, "Citizen Sensors for SHM: Use of Accelerometer Data from Smartphones," (2015) [https://www.ncbi.nlm.nih.gov/pmc/articles/PMC4367344/].

USPTO, "Class 367 Communications, Electrical: Acoustic Wave Systems and Devices," (Oct. 17, 2019) [http://www.uspto.gov/web/patents/classification/uspc367/sched367.htm].

JP Office Action dated Jan. 11, 2022, in Application No. JP2019-566059 with English translation.

* cited by examiner

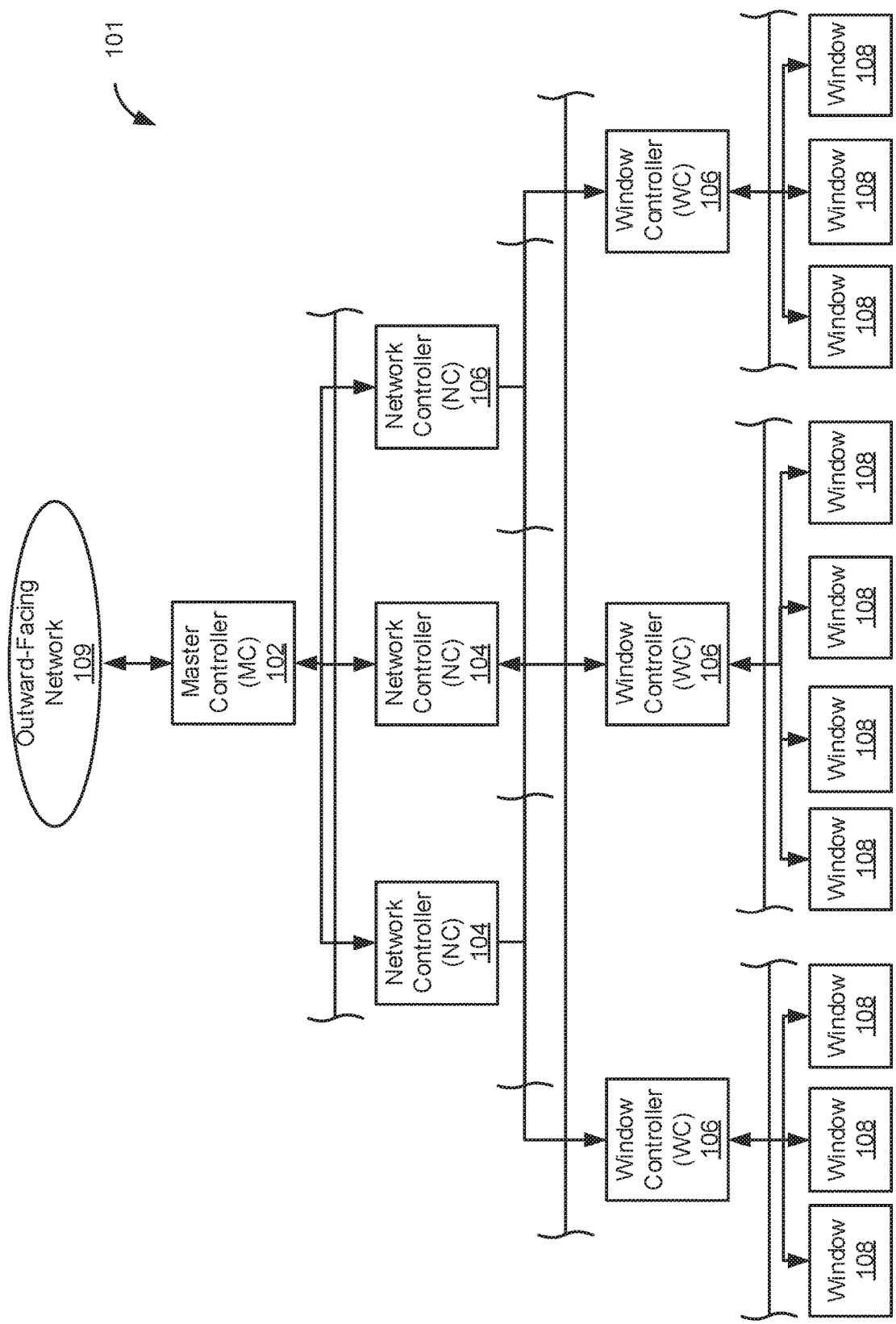

SEISMIC EVENT DETECTION SYSTEM

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety for all purposes.

FIELD

The present disclosure generally relates to safety systems for buildings and in particular to a building safety system which warns building occupants before the arrival of the hazardous ground motion typically associated with earthquakes and of approaching natural disasters that could impact an area. This advanced warning system can provide time for users to seek shelter which may reduce bodily injury and loss of life. In addition, this system can collect and add valuable data toward our understanding of earthquakes.

SUMMARY

One aspect of the present disclosure pertains to a system for detecting seismic waves in a building. The system includes: (a) a plurality of optically switchable windows; (b) a plurality of window controllers, each configured to control the optical state of at least one optically switchable window, where the window controllers are connected via a network; (c) a plurality of inertial sensors, each configured to measure inertial data in at least one direction when affixed to the building and provide the measured inertial data to the network; and (e) seismic event detection logic configured to (i)) identify or receive a building response signature, where the building response signature includes the measured inertial information from the inertial sensors and (ii) analyze the building response signature to determine that a seismic event has occurred. In some embodiments, the building response signature includes location data for each of the inertial sensors.

In some embodiments, the number of inertial sensors in a building may be between about 10% and about 30% of the number of optically switchable windows of the building. In other embodiments, the number of inertial sensors in a building may be between about 30% and about 70% of the number of optically switchable windows of the building. In some cases, there may be more than about 2, more than about 10, or more than about 50 inertial sensors in a building.

In some embodiments, at least one of the inertial sensors is located within a housing for one of the window controllers. In other embodiments, at least one of the inertial sensors is located within a housing for a light sensor, where the light sensor is connected the network and configured to provided lighting information to the network for controlling the optically switchable windows.

The inertial sensors may include accelerometers and/or gyroscopes. In some cases, the inertial sensors are MEMS devices. In some cases, accelerometers and/or gyroscopes may have a sensitivity greater than about 0.5 V/g, and in some cases greater than about 1 V/g. In some cases, accelerometers and/or gyroscopes may have a sample frequency greater than about 1 kHz, and in some cases, the sampling frequency of inertial sensors may be greater than about 2 kHz.

In some embodiments, the system includes one or more additional sensors (e.g., a strain gauge, an anemometer, a temperature sensor, a piezometer, a GPS sensor, and/or a camera) which provide additional data to the network which is included in the building response signature.

In some embodiments, at least one inertial sensor is configured to provide inertial data to the network via a wireless connection to one of the widow controllers. The network may, in some cases, be configured to deliver power the window controllers and the inertial sensors. In some embodiments, at least one inertial sensor is rigidly affixed to a structural component of the building. The structural component may be, e.g., part of the building's framing structure and/or rigidly affixed to the building's foundation. In some cases, the structural component may be a metal beam, a concrete floor, a mullion, or a transom In some embodiments, the seismic event detection logic is configured to determine if a building response signature corresponds to a P-wave. The seismic event detection logic may also be configured to determine the seismic hypocenter of the P-wave, estimate an arrival of a corresponding S-wave, or trigger an alert after determining that the building response signature corresponds to a P-wave.

In some embodiments, the seismic event detection logic is configured to determine if one or more of the inertial sensors is not functioning properly. Seismic event detection logic may be operated on a cloud computing platform, and in some cases, seismic event detection logic may be operated on a distributed computing platform that includes at least one of the window controllers. In some embodiments, the seismic event detection logic may be configured to receive information from an external earthquake event detection network.

In some embodiments, the seismic event detection logic is configured to analyze the building response signature using a seismic model. A seismic model may include an expression or lookup table that relates the building response signature to an occurrence of a seismic event. In some cases, the seismic model is generated using baseline signature data that is collected from the inertial sensors.

In some embodiments, the seismic model is generated using structural building information. For example, a seismic model may be generated based in part on a 3D building model. In some cases, the seismic model represents the building as a mass-spring-damper system. In some cases, the seismic event detection logic provides the building response signature to an active mass damper system when a building experiences lateral loads. Seismic detection logic may, in some cases, be configured to detect a structural change in the building. In such cases, the logic may also be configured to determine that the structural change creates a safety threat and trigger an alert. Triggered alerts may include audible or visual alerts. In some embodiments, triggering an alert includes unlocking doors, closing gas lines, and/or closing water lines.

Another aspect of the present disclosure pertains to a method for detecting seismic events in a building. The method includes operations of at least (a)-(c). In operation (a), a window control system is installed in the building. The window control system includes a plurality of optically switchable windows, a plurality of window controllers, and a plurality of inertial sensors. Each window controller is configured to control the optical state of at least one optically switchable window, and the window controllers are connected by a network. The inertial sensors are distributed in at least two dimensions in the building, and each sensor is configured to measure inertial data in at least one direction and provide measured inertial data to the network. In operation (b) a building response signature is generated which includes the inertial data provided to the network. In operation (c) a seismic event is detected by analyzing the building response signature using seismic event detection logic.

In some cases, the building response signature includes location data for the inertial sensors. In some cases, at least one inertial sensor includes an accelerometer or gyroscope. In some cases, the method also includes installing one or more additional sensors in the building (e.g., a strain gauge, an anemometer, a temperature sensor, a piezometer, a GPS sensor, and/or a camera), where the one or more additional sensors provide additional data to the network that is included in the building response signature.

In some cases, detecting that a seismic event has occurred includes detecting a P-wave when analyzing the building response signature using the seismic detection logic. The method may also include determining the seismic hypocenter of the P-wave or estimating an arrival of a corresponding S-wave based at least in part on the building response signature. The method may also include an operation of triggering an alert after detecting that a seismic event has occurred.

In some cases, the building response signature is analyzed by the seismic event detection logic using a seismic model. In some cases, the method also includes an operation of detecting a structural change in the building. In some cases, seismic detection logic is used to determine that the structural change creates a safety threat, and an alert is triggered.

These and other features of the disclosed embodiments will be described more fully with reference to the associated drawings.

BRIEF DESCRIPTION OF THE DRAWINGS

FIG. 1 depicts an example of a window control system that may be implemented in a building.

Like reference numbers and designations in the various drawings indicate like elements.

DETAILED DESCRIPTION

Figure 2A:
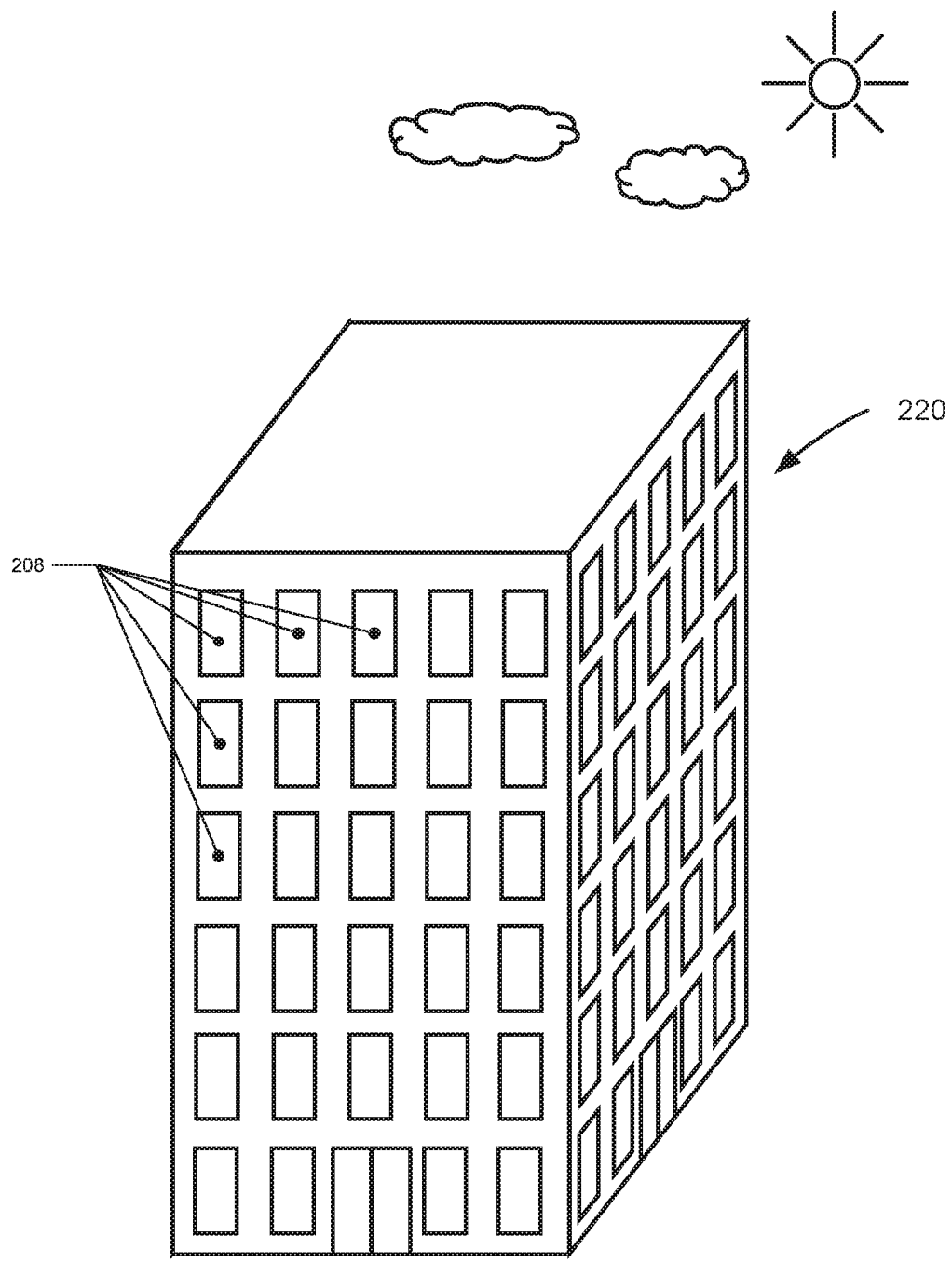
FIGS. 2a-2d depict a building, outfitted with a plurality of inertial sensors that are configured to measure a building response signature.

The following detailed description is directed to certain embodiments or implementations for the purposes of describing the disclosed aspects. However, the teachings herein can be applied and implemented in a multitude of different ways. In the following detailed description, references are made to the accompanying drawings. Although the disclosed implementations are described in sufficient detail to enable one skilled in the art to practice the implementations, it is to be understood that these examples are not limiting; other implementations may be used, and changes may be made to the disclosed implementations without departing from their spirit and scope. Furthermore, while the disclosed embodiments focus on electrochromic windows (also referred to as smart windows), the concepts disclosed herein may apply to other types of optically switchable devices. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B, and C." The terminology "designed to," "adapted to," "configured to," "programmed to," "operable to," and "capable of" may be used interchangeably where appropriate. Such terminology is understood to connote structure and is not intended to invoke 35 U.S.C. 112 (f).

SEISMIC EVENT—Seismic events refer to incidents in which seismic waves travel through the earth's crust or upper mantle. At the Earth's surface, seismic events manifest themselves by shaking and sometimes displacement of ground. Typically, seismic events have a natural cause such a rupture or movement of a geological fault to release pressure, landslides, or volcanic activity. In some cases, seismic events include artificially produced large earth tremors that are triggered by human activity. For example, seismic events may be caused or triggered by large explosions (e.g., mine blasts and nuclear explosions), crustal shifts caused by water depletion, and fracking. In some cases, seismic events may also trigger other disasters. For instance, when the hypocenter of a large earthquake is offshore, the seabed may be displaced sufficiently to cause a tsunami. In other cases, a seismic event may trigger landslides, avalanches, and fires. While the term "epicenter" is commonly used to describe the origin of an earthquake, the more precise term "hypocenter" will be used herein. An epicenter is a point on the earth's surface directly above the hypocenter.

BUILDING—Buildings are structures that are typically suitable for human entry and/or occupancy. Within this realm, buildings may be small or large structures. For example, a building may be a small dwelling, a tall skyscraper, or any other sized structure. In some cases, a building is a fixed structure having a roof, wall, and windows.

FRAMING STRUCTURE—The framing structure refers to any integral load-bearing components that transfer the loads within a building such as concrete slabs, beams (e.g., transoms and mullions), fasteners, and curtain walls. The framing structure of a building transfers loads vertically to the building's foundation and well as horizontally, e.g., in the case of wind or a shockwave. As used herein, the building structure also refers to the geometrical arrangement of these integral components.

BUILDING FOUNDATION—A foundation is the element of the building which connects it to the ground and transfers loads from the building to the underlying rock or soil. Foundations may be classified as shallow or deep. Shallow foundations, sometimes referred to as footings, are foundations in which the foundation depth is less than the building breadth and also less than about 3 meters deep into the ground. In cases in which a building is massive or in which the top topsoil is weak, deep foundations may be used. Deep foundations extend deeper than about 3 meters from the surface of the ground. In some cases, piles or caissons driven into the ground to transfer a building's load through a weak layer of topsoil to the stronger layer of subsoil or bedrock below. Piles or caissons may penetrate through several meters to bedrock, but sometimes they do not reach bedrock.

OPTICALLY SWITCHABLE WINDOW—Optically switchable windows exhibit a controllable and reversible change in an optical property when a stimulus is applied, e.g., an applied voltage. The optical property is typically one or more of color, transmittance, absorbance, and reflectance. Electrochromic (EC) devices are sometimes used in optically switchable windows. One well-known electrochromic material, for example, is tungsten oxide ($WO_3$). Tungsten oxide is a cathodic electrochromic material in which a coloration transition, transparent to blue, occurs by electrochemical reduction. Optically switchable windows, whether electrochromic or otherwise, may be used in buildings to control transmission of solar energy and thus heat load imposed on the interior of the building. The control may be manual or automatic and may be used for maintaining occupant comfort while reducing the energy consumption of heating, air conditioning and/or lighting systems. Examples of optically switchable windows are presented in U.S. patent application Ser. No. 12/645,111, filed Dec. 22, 2009, and titled "FABRICATION OF LOW DEFECTIVITY ELECTROCHROMIC DEVICES," and in PCT Published Application No. WO2015168626, filed May 1, 2015, and titled "ELECTROCHROMIC DEVICES" which are herein incorporated by reference in their entirety.

WINDOW CONTROLLER—Window controllers are units responsible for applying a current and/or voltage to one or more electrochromic windows, e.g., in a building. Windows may be grouped or zoned, be on different sides and/or floors of a building. Generally, window controllers receive a control signal specifying the tint level that is to be applied to the electrochromic windows. In some embodiments, such control signals are passed over a window network and originate from sources such as user-controlled input, window network tint intelligence, and/or a building management system (BMS). Examples of window network tint intelligence are presented in both U.S. patent application Ser. No. 15/347,677, filed May 7, 2015, and titled "CONTROL METHOD FOR TINTABLE WINDOWS", and International PCT Application PCT/US16/41344, filed Jan. 12, 2017, and titled "CONTROL METHOD FOR TINTABLE WINDOWS," each of which is herein incorporated by reference in its entirety.

In certain embodiments, a window controller is placed near the electrochromic window (e.g., within about 1 meter of the edge of the window), adjacent to, on the glass or inside a window, or within a frame of the self-contained assembly. In some embodiments, a window controller is part of a window assembly, a window or laminate. In some cases, a window controller is attached to a structural component of a building; e.g., a steel I-beam or a concrete slab. Further examples of window controllers and their features are presented in International Patent Application No. PCT/US17/20805, filed Mar. 3, 2017, and titled "METHOD OF COMMISSIONING ELECTROCHROMIC WINDOWS"; U.S. patent application Ser. No. 15/334,835, filed Oct. 26, 2016, and titled "CONTROLLERS FOR OPTICALLY-SWITCHABLE DEVICES"; and U.S. patent application Ser. No. 13/449,248, filed Oct. 17, 2013, and titled "CONTROLLER FOR OPTICALLY-SWITCHABLE WINDOWS"; each of which is herein incorporated by reference in its entirety.

WINDOW CONTROL SYSTEM—When a building is outfitted with optically switchable windows, window controllers may be connected to one another and/or other entities via a communications network sometimes referred to as a window control network. The network and the various devices (e.g., controllers and sensors) that are connected via the network (e.g., wired or wireless power transfer and/or communication) are referred to herein as a window control system. Window control networks may provide tint instructions to window controllers, provide window information to master controllers or other network entities, and the like. Examples of window information include current tint state or other information collected by window controller. In some cases, a window controller has one or more associated sensors that provide sensed information over the network. Sensors and other devices that are part of a window control system need have a direct impact on window control. For example, logic for controlling the optical states of windows may not consider the output of inertial sensors, yet these sensors are still considered part of the window control system. In some cases, one or more sensors are connected to the network independently of a window controller. Examples of sensors that may provide information over a window controller network include photosensors, temperature sensors, occupancy sensors and inertial sensors. A sensor unit for providing lighting data may be located on a rooftop of a building, e.g. as described in U.S. patent application Ser. No. 15/287,646, filed Oct. 6, 2016, and titled "MULTI-SENSOR," which is herein incorporated by reference in its entirety. Such sensors may obviate the need for optical sensors at the window location and thus make the window control system much less complex than those that rely on multiple sensors at the window's physical location.

FIG. 1 provides an example of a control network 101 of a window control system. The network may distribute both control instructions and feedback, as well as serving as a power distribution network. A master controller 102 communicates and functions in conjunction with multiple network controllers 104, each of which network controllers is capable of addressing a plurality of window controllers 106 (sometimes referred to herein as leaf controllers) that apply a voltage or current to control the tint state of one or more optically switchable windows 108. In some implementations, the master controller issues the high-level instructions (such as the final tint states of the electrochromic windows) to the network controllers, and the network controllers then communicate the instructions to the corresponding window controllers. Typically a master controller is configured to communicate with one or more outward face networks 109.

In some embodiments, outward facing network 109 is part of or connected to a building management system (BMS). A BMS is a computer-based control system that can be installed in a building to monitor and control the building's mechanical and electrical equipment. A BMS may be configured to control the operation of HVAC systems, lighting systems, power systems, elevators, fire systems, security systems, and other safety systems. BMSs are frequently used in large buildings where they function to control the environment within the building. For example, a BMS may monitor and control the lighting, temperature, carbon dioxide levels, and humidity within the building. In doing so, a BMS may control the operation of furnaces, air conditioners, blowers, vents, gas lines, water lines, and the like. To control a building's environment, the BMS may turn on and off these various devices according to rules established by, for example, a building administrator. One function of a BMS is to maintain a comfortable environment for the occupants of a building. In some implementations, a BMS can be configured not only to monitor and control building conditions, but also to optimize the synergy between various systems—for example, to conserve energy and lower building operation costs. In some implementations, a BMS can be configured with a disaster response. For example, a BMS may initiate the use of backup generators and turn off water lines and gas lines.

In some embodiments, network 109 is a remote network. For example, network 109 may operate in the cloud or on a device remote from the building having the optically switchable windows. In some embodiments, network 109 is a network that provides information or allows control of optically switchable windows via a remote wireless device. In some cases, network 109 includes seismic event detection logic. Further examples of window control systems and their features are presented in U.S. patent application Ser. No. 15/334,832, filed Oct. 26, 2016, and titled "CONTROLLERS FOR OPTICALLY—SWITCHABLE DEVICES" and International Patent Application No. PCT/US17/62634, filed on Nov. 23, 2016, and titled "AUTOMATED COMMISSIONING OF CONTROLLERS IN A WINDOW NETWORK," both of which are herein incorporated by reference in its entirety.

INERTIAL SENSOR—Inertial sensors are electronic devices that measure and report linear and/or rotational accelerations. Accelerometers are sensors that measure linear acceleration and gyroscopes are sensors that measure rotational acceleration. Microelectromechanical systems (MEMS) type accelerometers and gyroscopes are frequently found in devices such as automobiles and mobile devices. A single sensor unit may measure linear and/or rotational acceleration along one, two, or three axes. For instance, many smartphones, such as the Apple iPhone™, include an inertial sensor that measures linear and rotational acceleration about three axes. When placed in a building or other structure, inertial sensors may be used to detect vibrations and movements resulting from seismic waves or other sources.

While the present disclosure is provided with microelectronic inertial sensors in mind, any sensor known now, or later developed, which can be used for monitoring the dynamic response of a building can also be used. For example, future developments in geolocation technology (e.g., GPS) may be sensitive enough for seismic detection systems. In some cases, the movement of a building may be measured optically, or by monitoring the strain in a building's framing structure using strain gauges. In some embodiments, an inertial response of a building is monitored using a combination of different types of sensors at one or more locations in a building to provide more accurate or reliable inertial data then would be otherwise be had. All such systems and methods for measuring the inertial response of a building are meant to fall within the scope of this disclosure.

BUILDING RESPONSE SIGNATURE—A building response signature refers to the inertial data collected by inertial sensors at a plurality of locations within a building; e.g., on various floors of a building. A building response signature records inertial data at various locations in a building when the building reacts to a stimulus. For example, a building response signature may record common events such as a truck rumbling down an adjacent road, high winds, nearby jackhammering, a fireworks display, mining or construction activity including use of explosives and/or heavy machinery, vibrations from an underground or adjacent parking garage, and normal business day occupancy. Any one or combination of these or other sources of vibration may constitute a building's response signature. A building response signature may be used to record inertial measurements corresponding to more serious events such as P-waves and S-waves from an earthquake. In some cases, a building response signature may refer all of the inertial data collected in a building corresponding to a particular event. For example, a building response signature may correspond a period of time, e.g., for about 10 seconds after the event, in which motion is detected. In some cases, a building response signature may include historical inertial data of a building. Using a building response signature, seismic event detection logic may be used to determine the dynamic conditions of a building. In some cases, a building response signature may be analyzed to characterize a structural change within a building. In some cases, a building response signature may be analyzed to characterize a seismic event or another event causing motion within a building. In some cases, the building response signature is normalized by, for example, applying a baseline response of the building. As an example, the normalizing baseline response may be obtained from data collected as a continuous stream of measurements taken by inertial sensors within a building.

SEISMIC MODEL—A seismic model is used to classify stimuli based upon inertial measurements in a building response signature. Generally speaking, a seismic model makes use of a building's structural properties so that inertial data measured throughout a building may be interpreted collectively. A seismic model may include lookup tables, expressions, computer-aided engineering models of a building, and the like. In some cases, a seismic model returns one or more outputs when a building response signature is provided as an input. For example, a seismic model may output classifications of events that may have caused building movement. Certain ranges or patterns found within inertial data of a building response signature may be correlated to windstorms, earthquakes, and the like. In some cases, a seismic model may be used to determine a structural change within a building. A building response signature in which a shift in a building's natural frequency is observed may be correlated to structural damage or building renovation. In some cases, a seismic model may correlate inertial data to loads and/or stresses experienced by structural components that might lead to failure of components within a building. In some cases, a seismic model may be used by seismic event detection logic to determine if a seismic event has occurred, or if there has been a structural change within a building.

SEISMIC EVENT DETECTION LOGIC—Seismic event detection logic is logic that, when executed, processes data from a plurality of inertial sensors and determines whether a seismic event has occurred. When the inertial sensors are provided in a single building, this data may be provided as a building response signature. In some cases, seismic event detection logic may make a determination of a seismic event by inputting a building response signature into a seismic model to collectively interpret inertial data from various locations withing of a building. Certain building response signatures are produced only or primarily when the building is responding to a seismic event. In some implementations, the seismic event detection logic is designed or configured to discriminate between building response signatures produced by seismic events and those produced by other stimuli. Regardless of whether a building response signature is determined, the seismic event detection logic discriminates between building sensor data produced by typical non-threatening events and seismic events. In some cases, the logic is designed or configured to predict the magnitude and epicenter and/or hypocenter of a seismic event. In some cases, the logic is designed or configured to identify fast traveling pressure waves produced by a seismic event. Upon identifying such waves, the logic may determine that slower traveling shear waves are approaching a building and will soon arrive. In some cases, the logic is designed or configured to predict how soon the shear waves will arrive. In certain embodiments, the logic is configured to send out an alert, e.g., to building occupants, news outlets, state agencies, emergency responders, other building systems, other buildings, mobile devices, and the like.

When processing data from a plurality of inertial sensors, seismic event detection logic may use algorithms and models such as those known by one of ordinary skill in the art. When processing data, seismic event detection logic may make use statistical processes such as linear regression, logistic region, ordinary least square regression, and polynomial regression. In some cases, the logic is implemented as a neural network. In some cases, seismic event detection logic uses machine learning methods (including deep learning methods) that allow the logic to improve over time, e.g., by monitoring the building response signature due to non-threatening events such as a mild windstorm, mining or construction activity, or other events that impart inertial activity to the building.

It will be appreciated by one of skill in that art that that seismic event detection logic, may be implemented using computer code written in any programming language that can be executed on a computer system and/or server or server system such as, for example, C, C++, HTML, Java™, JavaScript, ActiveX, Python, and Ruby on Rails. Seismic event detection logic may be implemented using hardware, software, firmware, and various combinations thereof. The code for seismic event detection logic may be in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code for seismic event detection logic, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

ALERTS—Alerts are sent to warn individuals or systems that future damage or danger is possible or likely. Seismic event detection logic may trigger alerts to warn building occupants or nearby emergency personnel of approaching seismic waves or of damage incurred by a seismic event. Alerts may be given using strobing lights, sirens, an audio message relayed by an intercom, lights instructing occupants to a building exit, alerts to mobile devices, and the like.

General Description

One aspect of the present disclosure relates to buildings or other structures outfitted with a plurality of inertial sensors. In some cases, a building may be outfitted with a plurality of optically switchable windows having associated inertial sensors. A window may be associated with an inertial sensor when a window controller that controls the tint state of an optically switchable window also receives information from the inertial sensor. In some embodiments, the window controller contains the inertial sensor, while in other embodiments the inertial sensor is associated with the smart window in another way, such as where the inertial sensor is integrated into the window construction. For example, an insulated glass unit could have one or more inertial sensors in the secondary seal area, in the spacer, or on the glass (e.g., inside the IGU or outside the IGU). By using inertial sensors placed throughout a building, the dynamic response of a building is measured. The measured response is recorded as a building response signature. Using seismic event detection logic, a building's response signature may be analyzed to characterize seismic events and/or other events causing building motion. In some cases, seismic event detection logic may identify from a building response signature that additional seismic waves are arriving and inform earthquake warning systems, damage mitigation systems, and the like. One embodiment is a window control system including one or more inertial sensors configured for detection of seismic activity. The one or more inertial sensors may be associated with window controllers of the building, e.g., leaf controllers, network controllers and/or master controllers. The one or more inertial sensors may also be, in addition or alternatively, associated with a sensor, e.g., individual window sensors and/or a rooftop sensor, used to collect light data for the window control system. In one embodiment, the one or more inertial sensors are configured in a rooftop sensor such as those commercially available from View, Inc. of California, and described in U.S. patent application Ser. No. 15/287,646, filed Oct. 6, 2016, and titled "MULTI-SENSOR," which is herein incorporated by reference in its entirety. In certain instances, it is advantageous to have many inertial sensors, e.g., included in many or all leaf controllers and/or light sensors of a window control system, in order to collect as much seismic data as possible from a number of locations in the building. In other instances, one or more inertial sensors in a rooftop light data sensor may be sufficient, given widespread adoption of tintable glazings and, e.g., where many buildings each have a rooftop sensor so equipped. In all such cases, a seismic detection grid or network is created, when the inertial sensor data is used collectively.

A naturally-occurring earthquake happens when tectonic forces release stored elastic strain energy along a geological fault. Material on one side of a fault moves in relation to the other side of the fault. Sliding starts at a location, known as the hypocenter, and propagates in either direction along the fault surface. The speed of a fault tear is slower and distinct from resultant pressure and shear waves that are emitted. In a normal fault, tensional forces cause extension and the material above the fault to move downward relative to the material beneath the fault. In a reverse fault, the compressional forces cause the material above the fault to move upward relative to the material beneath the fault. In a strike-slip fault, shearing forces cause the material on one side of the fault to move horizontally relative to the material on the other side. A fault that is best described as a combination of these classifications may be described as an oblique fault. Each of these fault types provides the potential for producing destructive seismic waves, and each produces P-waves in advance of S-waves.

Pressure waves, also called primary waves or "P-waves," are compressional waves that are longitudinal in nature. Shear waves also called secondary waves or "S-waves," are transverse in nature and only travel through solid materials that support shear stresses. S-waves are slower than P-waves, and speeds are typically around 60% of that of P-waves in any given material. P-waves are usually undetectable by human senses or are merely felt as an initial jolt, while S-waves may generate periodic motion (typically at about 1 Hz) that is more damaging to buildings and other structures. Damaging effects of S-waves are often magnified when a building has a resonant period similar to that of the shear waves. These waves are strongest at the ends of the slippage and may project destructive waves at great distances beyond the hypocenter. The intensity of propagating seismic waves may be highly dependent on factors such as the soil conditions in the region.

Since P-waves travel faster than S-waves, P-waves may be used to detect a seismic event before the arrival the more destructive S-waves. Using seismic event detection logic which receives data from an associated seismic detection system described herein, an identified P-waves may trigger an alert system of an impending earthquake, more specifically, the future arrival of S-waves. Due to the delay of the S-waves, building occupants may be warned by an alert of an impending quake seconds or minutes before the shaking begins. Having a warning alert system, even if only seconds before shaking beings, may be the difference between life and death for building occupants and/or individuals in surrounding areas. For example, a warned occupant may have time to find shelter within a room or evacuate a building before severe shaking beings. Even a few seconds before a mild tremor might be enough time to alert a surgeon to wait to make a delicate incision during a surgical operation. Alert systems may also be configured to close gas lines and water lines, reducing fire or flooding risks within the building.

System

FIGS. 2a-2d depict a building, outfitted with a plurality of inertial sensors that are configured to measure a building response signature. Shown in FIG. 2a, building 220 may be outfitted with optically switchable windows 208 that have associated inertial sensors. Inertial sensors may include accelerometers, inclinometers, gyroscopes, and the like. In some cases, additional sensors such as strain gauges, occupancy sensors, or temperature sensors may be used to provide information that is included in a building response signature.

An inertial sensor may be located, e.g., at any place where the sensor may be rigidly coupled to the framing structure of a building. Windows are often closely coupled to the framing structure of a building, making them a convenient location to attach inertial sensors. In some cases, inertial sensors are attached to a window frame, located within a window controller unit, or located on the window glass. When a window controller is configured with inertial sensors, a window controller may be attached to the window frame itself, or attached to a nearby structural component of the building. In some cases, inertial sensors and/or other sensors may be attached to a support beam, a concrete slab or other another component within the wall of a building that is accessed during window installation but would ordinarily be hidden from view. In some cases, inertial sensors may be attached to mullion or a transom. In some cases, inertial sensors are rigidly affixed to the building's foundation. In some cases, inertial sensors are affixed to one or more light sensors that are part of or associated with the window control system. In some cases, inertial sensors are remote from an associated window or window controller. For example, an inertial sensor may be rigidly attached to the framing structure of a building and configured to receive power and/or transmit data to a nearby window controller by wire. In some cases, inertial sensors may receive power and/or transmit data wirelessly to a nearby window controller. In some cases, a sensor may receive power wirelessly. Examples of wireless power delivery systems are presented in U.S. patent application Ser. No. 62/402,957, filed Sep. 30, 2016, and titled "WIRELESS POWERED ELECTROCHROMIC WINDOWS" which is herein incorporated by reference in its entirety. Examples of window antennas that may be used for wireless power delivery are presented in International Patent Application No. PCT/US17/31106, filed May 4, 2017, and titled "WINDOW ANTENNAS" which is herein incorporated by reference in its entirety.

In some embodiments, a plurality of inertial sensors may be in communication (e.g., wire or wireless communication) with various window controllers (e.g., master controllers, network controllers, and leaf controllers) and other devices (e.g., light sensors) of the window control system, such that inertial data from the plurality of inertial sensors may be easily aggregated into a building response signature. Examples of control networks used by the window control system are described elsewhere herein. In some cases, inertial sensors may provide an analog or digital signal of measured linear acceleration data along one, two, or three axes. In some cases, inertial sensors may provide rotational acceleration data about one, two, or three axes. In some cases, sensors may provide integrated values of linear velocity and displacement and/or rotational velocity and displacement corresponding to one, two, or three axes.

In one embodiment, inertial sensors are provided within the housing of a window controller. Alternatively or additionally, inertial sensors may be located in the housing of other controllers in the window control network, for example, in a network controller, a master controller, and/or a control panel. In some embodiments, inertial sensors may be located in or associated with one or more light sensors that are part of or associated with a window control system. In other embodiments, a plurality of inertial sensors are configured both in window controllers (leaf, network, master or other) and in light sensors of the window control system. Any of these locations may provide suitable housing and infrastructure for inertial sensors, provided they are sufficiently rigidly coupled to building. In addition to providing power to inertial sensors and transmission of inertial data, a window control network may provide resources that can be leveraged by seismic event detection logic. For example, when a window control system is commissioned, the location of various windows and window controllers are mapped throughout the building. This location information, which is generally available on a window control network, may be incorporated into a building response signature and used by seismic event detection logic. In some cases, a window control system may have indoor or outdoor temperature sensors that inform seismic event detection logic. For example, measured temperatures may be used to provide temperature compensation information for inertial measurements, or to adjust an expected building response signature due to thermal variations. In another example, if seismic event detection logic identifies that sensors are non-functional or have irregularities, the logic may provide a report to a facilities manager indicating which sensors need maintenance.

Figure 2B:
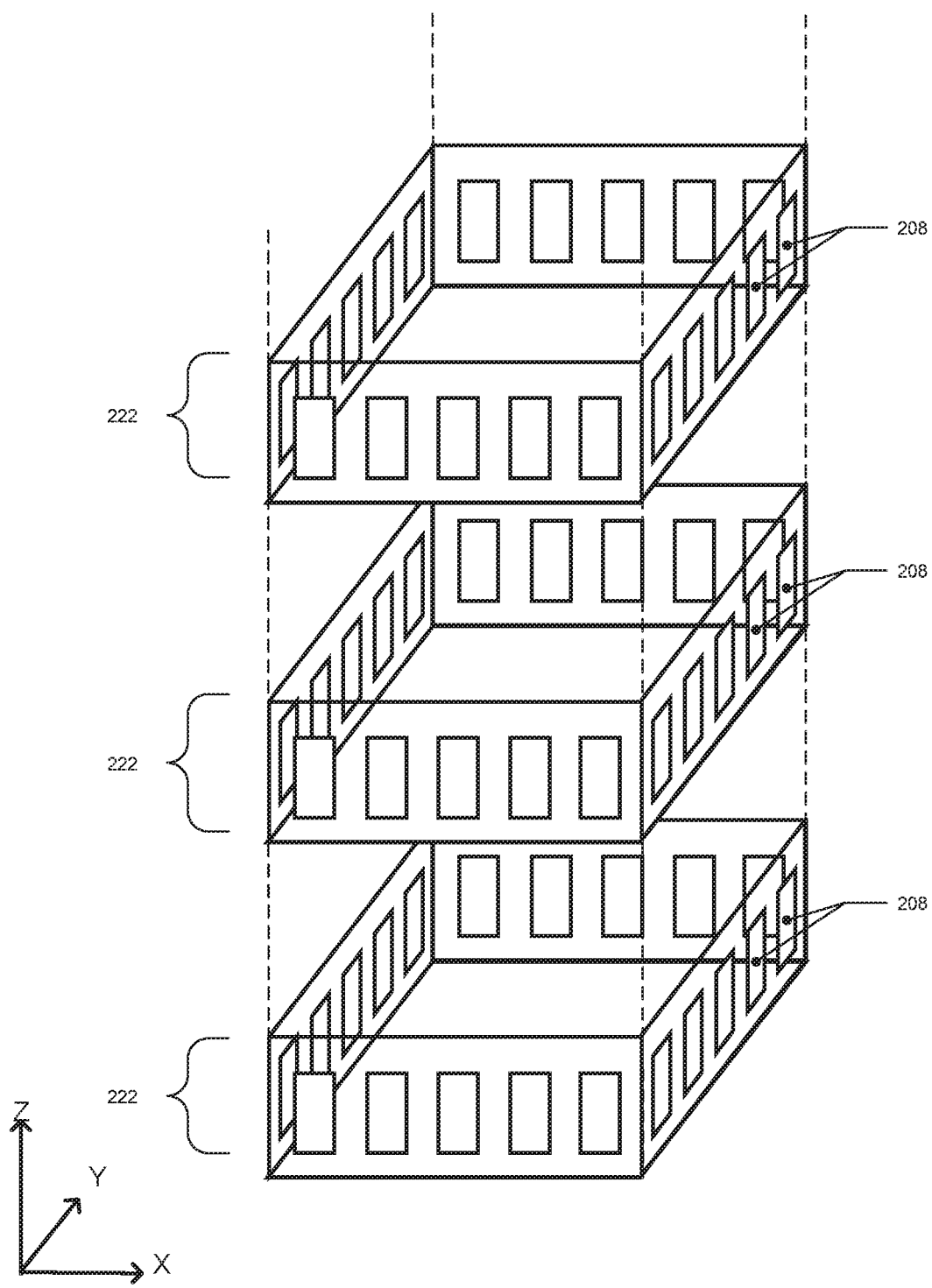

Inertial sensors are typically distributed in at least two dimensions within a building. For example, sensors may be associated with windows on facades facing different directions. In a multistory building, inertial sensors may be distributed amongst floors. FIG. 2b depicts several floors 222 of a multistory building in which inertial sensors, associated with windows 208, are distributed in by x and y directions. In this manner, windows 208 provide a series of data collection points on the surface of the building for accurately recording the three-dimensional movement into the building response signature. In some embodiments, interior windows may also have associated inertial sensors. In some embodiments, data for a building response signature may also be collected by sensors that are not on a window network. For example, inertial sensors may be located in a subterranean parking garage or within the foundation of the building. In some cases, a building may also be equipped with additional sensors that can be correlated to building motion such as strain gage sensors, GPS sensors, cameras, wind sensors, temperature sensors, and the like. In certain embodiments, inertial sensors of the window systems described may or may not coordinate with other inertial sensors of the building (or other buildings or locations, such as inertial sensors in the earth).

The number of inertial sensors a building is equipped with may vary depending on factors such as the building's size, construction, shape, height, complexity, and location. For example, a building may be equipped with inertial sensors at more than 3 locations, in some cases more than about 20 locations, and in some cases more than about 100 locations. In some cases, inertial sensors may be associated with about 10% to about 30% of the exterior windows of a building, in some cases inertial sensors may be associated with about 30% to about 70% of the exterior windows, and in some cases inertial sensors may be associated with greater than about 70% of the exterior windows. In some cases, inertial sensors may be associated with between about 10% and about 30%, between about 30% and about 70%, or greater than about 70% of the controllers on a window control system. In some cases, inertial sensors may associated with more than about 20%, more than about 50% or more than about 90% of the light sensors in a building.

In some cases, inertial sensors are MEMS accelerometers. In some cases, MEMS accelerometers have a self-noise level that is less than about 1 μg/√Hz, in some cases less than about 10 ng/√Hz, and in some cases less than about 1 ng/√Hz. If providing an analog output signal, inertial sensors may have a sensitivity that is greater than about 0.5 V/g, greater than about 1 V/g, and in some cases greater than about 5 V/g. In some cases, a MEMS accelerometer has a sampling rate greater than about 1 kHz, in some cases greater than about 2 kHz, and in some cases greater than about 4 kHz.

Figure 2C:
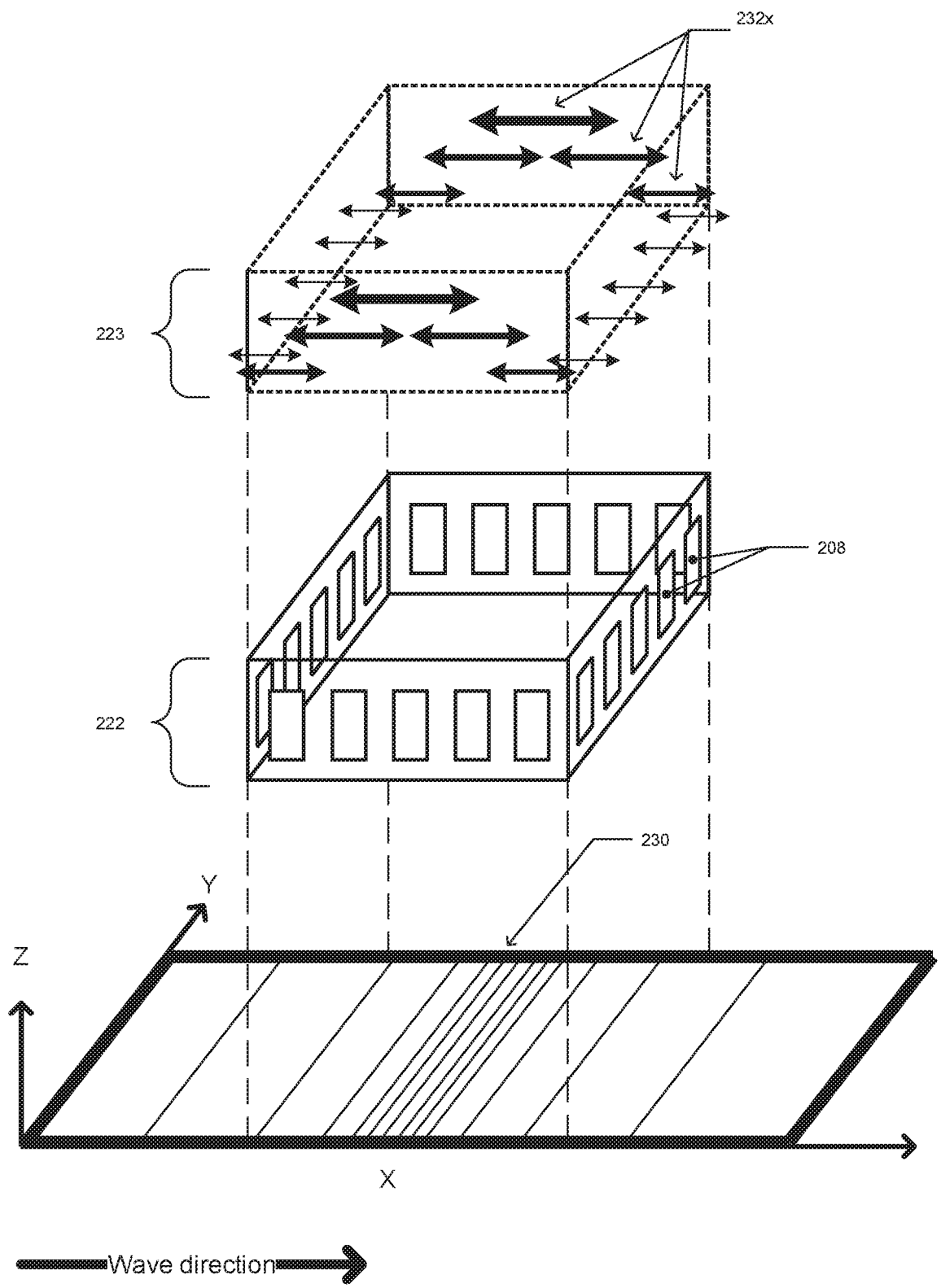
Figure 2D:
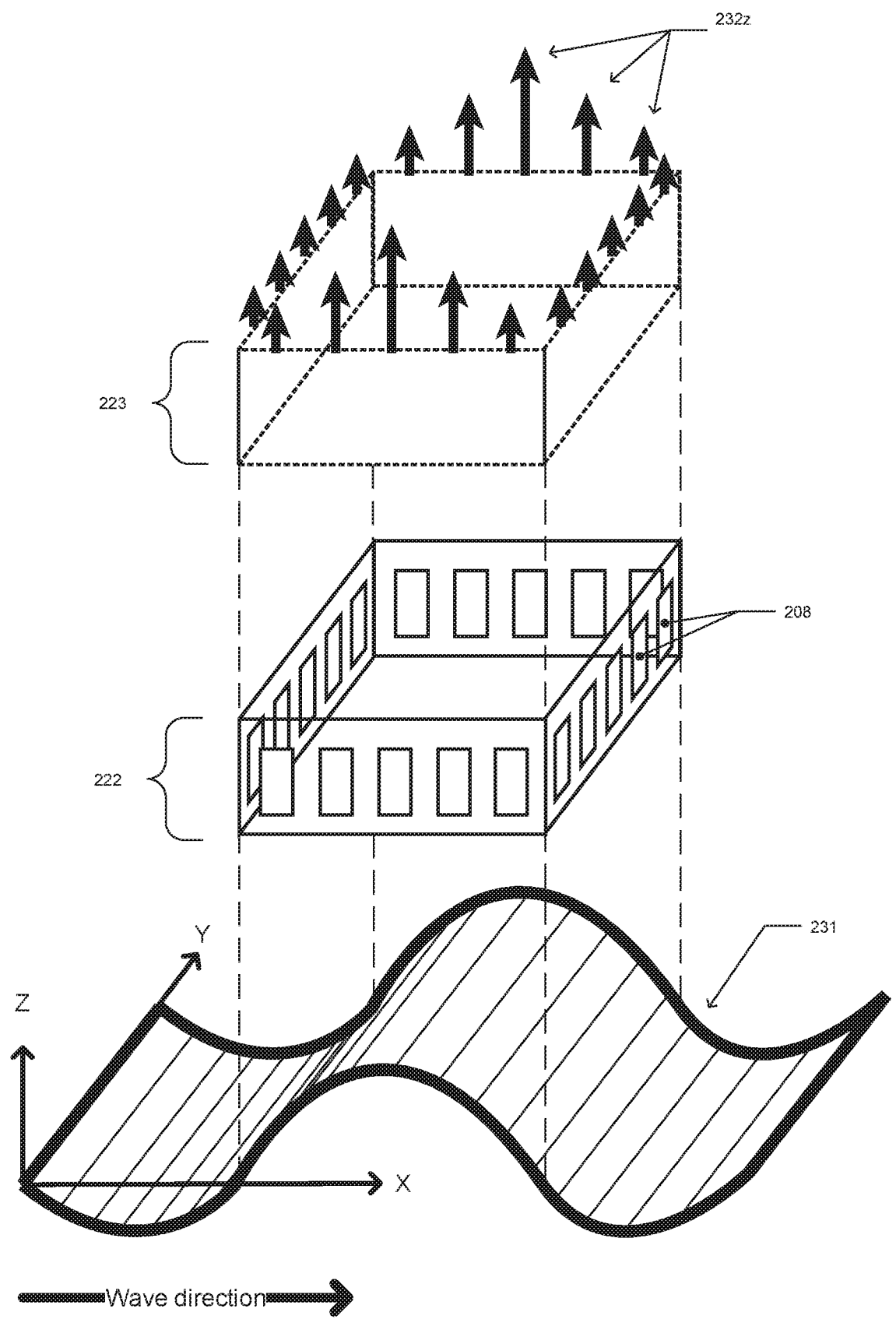

FIGS. 2c and 2d depict how distributed inertial sensors along both x and y coordinates may be collectively used to characterize a seismic event. A multistory building is depicted having floors 222 and 223. These floors have optically switchable windows with associated inertial sensors 208 (not shown in floor 223) that measure an inertial response. The magnitude of this inertial response is graphically depicted by arrows 232x in floor 223.

FIG. 2c depicts an example of a P-wave 230 passing through the ground underneath floors 222 and 223 in a building. The spacing of the lines in wave 230 is representative of the pressure gradient within the wave. As depicted, the wave's highest pressure gradient is centered underneath the building, and the measured inertial response is illustrated by arrows 232x. By analyzing the inertial response, properties including the speed, orientation, and magnitude of the seismic wave may be determined. In some cases, if seismic event detection logic interprets a building response signature as being representative in of a P-wave, an alert to may be triggered to warn building occupants of an approaching S-wave.

FIG. 2d depicts an example of an S-wave 231 passing through the ground underneath floors 222 and 223 of the building considered in FIG. 2c. S-wave 231 passes under the building at some time after P-wave 230 passes under the building. The shear wave results in displacement that is transverse to the wave direction. As drawn, inertial sensors distributed on one or more floors may record wave 231 as it passes through the building. These inertial measurements may then be analyzed to determine the strength of the wave, and for damages that may have occurred to the building. As depicted, the measured inertial response is illustrated by arrows 232z.

Seismic event detection logic may be used to discriminate seismic event signatures (e.g., P-waves) and non-seismic event signatures. As an illustration, if a large object is dropped in a building, the resulting motion may be detected nearby but not elsewhere. In some cases, a building response signature might record a single area showing a heightened response that quickly dissipates away from the event origin. By analyzing the building response signature, seismic event detection logic may determine that no seismic event has occurred. Alternatively, if a seismic event does occur, a consistent wavefront across a plurality of inertial sensors (e.g., as shown by measured responses 232x and 232z in FIGS. 2c and 2d, respectively) may be recorded in the building response signature and identified as a seismic event by seismic event detection logic. In some cases, seismic event detection logic may be able to determine information about the wave including the amplitude of the seismic wave and the direction of propagation.

Seismic event detection logic may be deployed at a number of locations including but not limited to, a network controller, a master controller, a remote device, and/or the cloud. In some embodiments, a plurality of controllers in a window control system may function together as a distributed computing platform, and the seismic event detection logic operates on the distributed computing platform. Window control systems that provide distributed control platforms are further described in U.S. Provisional Application No. 62/607,618, filed Dec. 19, 2017, and titled "ELECTROCHROMIC WINDOWS WITH TRANSPARENT DISPLAY TECHNOLOGY FIELD," which is herein incorporated in its entirety. In some embodiments, a building response signature may be sent to the cloud or to a remote computer where seismic event detection logic analyzes the building response signature. In some cases, this may occur at intervals corresponding to when motion is detected. In some cases, inertial data may be processed by seismic event detection logic in real time. In some cases, inertial data may be transmitted over a window control network in less than 1 second, in some cases less than 100 milliseconds, and in some cases less than 10 milliseconds. In some cases, such as when buildings have the same owner or are equipped with the same type of window control system, building response signatures from all buildings may be simultaneously processed by seismic control logic on a single cloud device, thereby improving accuracy for size and location of an impending earthquake. In some cases, seismic event detection logic may report to or receive information from other quake detection networks, e.g., the collaborative Quake-Catcher Network, or USGS seismographic network. To this end, examples of remote monitoring systems are described in U.S. patent application Ser. No. 15/123,069, filed Mar. 5, 2015, and titled "MONITORING SITES CONTAINING SWITCHABLE OPTICAL DEVICES AND CONTROLLERS," which is herein incorporated by reference in its entirety. Examples of consoles where the seismic detection logic may be deployed are presented in International Patent Application No. PCT/US17/54120, filed Sep. 28, 2017, and titled "SITE MONITORING SYSTEM," which is herein incorporated by reference in its entirety.

Methods of Using Inertial Sensors in a Building

Figure 3:
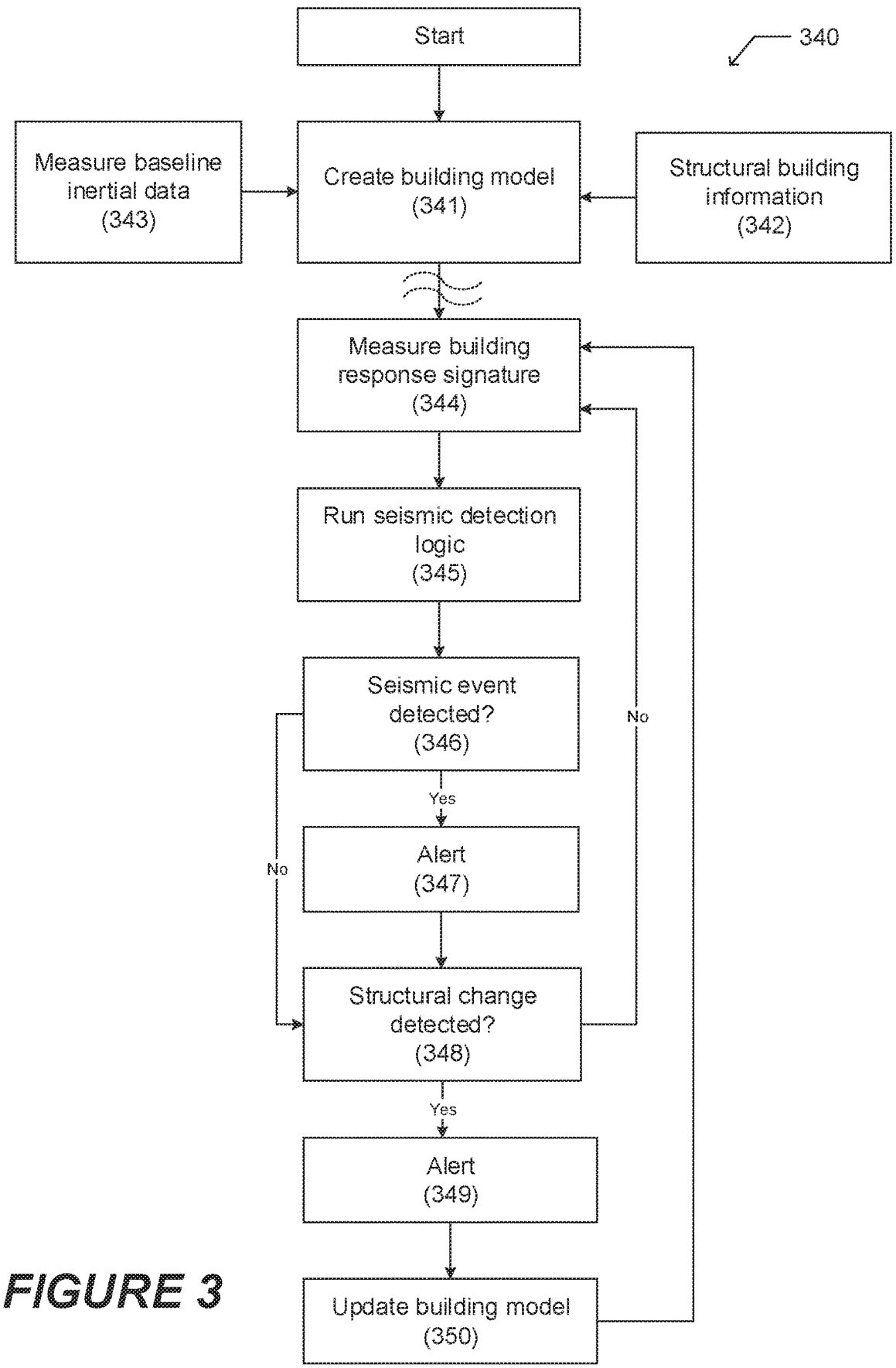
FIG. 3 is a process in which inertial sensors may be used to detect a seismic event and/or structural damage in a building.

FIG. 3 provides a flowchart 340 of a process where inertial sensors may be used to detect a seismic event and/or structural damage in a building. In step 341 a seismic model is created. Generally, step 341 is performed during construction of a building or when retrofitting a building with inertial sensors. A seismic model is used by seismic event detection logic to interpret measured inertial data. For example, measured inertial data may be input into the seismic model which in return outputs information characterizing the event that has caused the motion. In some cases, a seismic model may relate measured inertial data to locations on a building. In some cases, a seismic model may include an expression or lookup table relating inertial responses to dynamic conditions of a building. In some cases, a seismic model may relate measured inertial data to loads and/or stresses experienced by structural components, e.g., by accounting for the stiffness in a building's framing structure. In some cases, a seismic model may provide relationships between a shift in resonant frequency and structural failures.

In some embodiments, a seismic model is created using structural building information 342. For example, a seismic model may be created using architectural drawings or a 3D building model. 3D building models may be generated using computer-aided engineering software such as ANSYS, ABAQUS, AutoCAD Civil 3D, Revit and the like. 3D building models are created when designing a building, or at a later time such as when a building undergoes a major renovation. In some cases, 3D building models are updated to reflect changes in the building structure. These models provide an accurate representation of the building and include information relating to, e.g., the materials used in the building, the construction of the building, and the dimensions of the building. In some cases, the dimensional information of a 3D building model may be accurate to within a few centimeters of the physical building dimensions. In some embodiments, a seismic model may be generated automatically when seismic detection logic analyzes a 3D building model. Analysis of a 3D building model may, e.g., be used to determine the building's natural frequency and/or displacement thresholds that would be indicative of building damage. In some cases, the seismic detection logic is packaged as a module that is executed by a facilities management application. A facilities management application is a software tool that may be used to, e.g., commission a window network and/or generate a graphical user interface for controlling optically switchable windows. In some cases, the seismic detection logic may reference the same 3D building model file that is also used for other functions of the facility management application. Facilities management applications and 3D building models are further described in International Patent Application No. PCT/US17/62634, filed on Nov. 23, 2016, and titled "AUTOMATED COMMISSIONING OF CONTROLLERS IN A WINDOW NETWORK," which is herein incorporated by reference in its entirety.

Alternatively or additionally, a seismic model may be created by establishing a baseline signature of inertial data 343. For example, a building may be monitored for a period to determine inertial measurements corresponding benign events such as wind or occupant activity. After the baseline signature data is collected, a seismic model may be used to interpret building response signatures that fall within predetermined ranges as corresponding to non-threatening events.

When motion is detected by inertial sensors, a building response signature is recorded 344. Seismic event detection logic is then operated 345 to determine if a seismic event has occurred 346, or if there has been a structural change in the building 348. When the seismic event detection logic is executed, inertial sensors may continue to measure movements or vibrations in step 344. Generally, step 344 is a process that runs indefinitely once the system is configured. For example, a building response signature may include a continual stream of inertial data, or sensors may continually monitor for movements to record in a building response signature. In step 345 seismic event detection logic uses a seismic model to analyze a building response signature and determine if a seismic event has occurred. In some cases, seismic event detection logic may input inertial data into a seismic model. In some cases, seismic event detection logic may simply compare inertial data to baseline signature data. In some cases, seismic logic may receive information from one or more external earthquake detection networks (e.g., the Quake-Catcher Network, the USGS seismographic network, or another window-based network) that are used to confirm and/or characterize a seismic event. For example, the time differential between when P-waves are detected in a building and one or more other additional measurement locations that are provided over an external earthquake detection network may be used to determine the hypocenter and/or the estimated time at which S-waves will arrive. In some cases, the seismic event detection logic may have a confidence threshold which must be met in determining whether a seismic event has occurred. In some cases, seismic event detection logic may use statistical means to analyze large quantities of inertial data.

If seismic event detection logic determines that a seismic event has occurred, alert 347 will be triggered. In some cases, alert 347 will only be triggered if a seismic event is determined to have a critical strength, or pose a danger to building occupants. In some cases, if seismic detection logic has determined a structural change in a building that makes it seismically unsafe, the critical strength or threshold limits before an alert is triggered may be reduced. For example, if the building structurally deteriorates (gradually or abruptly), a predicted earthquake magnitude that triggers an alert may decrease. As an illustrative example, the threshold magnitude of a quake may be a 4.0 or 6.0 on the Richter scale depending on the recognized structural integrity of the building in question. If a building that once could withstand a magnitude 6.0 earthquake can no longer do so for any reason, the logic may need to be adjusted so that an alert is triggered when the seismic model predicts a magnitude 4.0 or above earthquake. Alert 347 may be transmitted from seismic event detection logic to a BMS, to a building alert system, to building occupants through a mobile app, and the like. In some cases, an alert may contain an analysis of the seismic event, such as the magnitude of a seismic event, or a prediction of an impending seismic event. In some cases, an alert may provide building occupants with an amount of time until S-waves arrive. In some cases, occupancy and/or inertial information may be used to coordinate or determine escape patterns for occupants for saving the most building occupants as possible, and an alert may instruct building occupants of these optimize escape routes. For example, a building response signature might indicate a particular escape route is unsafe, or occupancy sensors may indicate that a particular escape route may accommodate more people because of low building occupancy detected in that portion of a building. In some cases, an alert may shut off gas or fire lines. In some cases, an alert may alert emergency personnel. Alerts may also be used to send control signals to the electrochromic windows, e.g., when seismic events are detected. Controllers may be programmed to clear all the windows so that, e.g., emergency personnel can see into the building more easily and visually communicate with people inside the building if needed. In some cases, only windows where occupants are detected are cleared while windows while other windows remain tinted to help emergency personnel identify where building occupants are located in a building. In another example, windows are tinted to prevent heat gain on one or more sides of a building when the cooling system is shut down, impaired, or expected to be impaired due to loss of power or malfunction/damage from a seismic event. Additional examples of controlling window systems in response emergency situations (such as power emergency scenarios), that can be implemented after a seismic event are described in U.S. patent application Ser. No. 15/739,562, filed Dec. 12, 2017, and titled "POWER MANAGEMENT FOR ELECTROCHROMIC WINDOW NETWORKS," which is herein incorporated by reference in its entirety. After transmitting alert 347, or after determining that no seismic event has occurred, seismic event detection logic may be configured to determine whether a structural change has occurred. For example, seismic event detection logic may be used to determine failure within a joint or weld by monitoring changes in inertial data over time. If no structural change is detected, the process returns to measuring a building response signature when motion is detected. If a structural change is detected, alert 348 is triggered. Alert 348 may be transmitted from seismic event detection logic to a BMS, to a building alert system, to building occupants through a mobile app, and the like. Generally, the description regarding the alert in step 347 also pertains to the alert in step 348. If structural damage compromising the safety of building occupants is detected, instructions may be provided that request immediate evacuation. If a non-threatening structural change is detected, an alert may be sent to a building administrator suggesting further investigation. In cases where a structural change is deemed permanent or non-threatening, e.g., if a building is undergoing renovation, the seismic model may be updated 350, and the process returns to observing movements and measuring a building signature 344.

In some cases, a multi-story building may be modeled, in step 341 of process 340, as a mass-spring-damper system. While often thought of as being extremely rigid, a tall building may allow for a significant amount of sway under normal conditions. For instance, a building having 100 floors may sway on the order of several feet in a windstorm. When modeled as a complex mass-spring-damper system, the relationships between inertial data collected on different levels may be used to provide greater insight into an event causing building motion. In determining if a seismic event has occurred, seismic event logic may look for patterns between inertial data on different floors. For instance, when a seismic wave is recorded on the ground floor of a building the inertial sensors on a higher level may be expected to have a delayed response and measure a greater displacement. In some cases, if sensors on upper stories do not reflect a predetermined pattern, then a seismic event may be ruled out as a possibility. In some cases, seismic logic may account for the current motion of a building when analyzing subsequent inertial measurements. For example, if a building experiences motion due to a windstorm, that motion may be taken into account when determining if a building response signature corresponds to a seismic event. In some embodiments, amplified signals (due to building sway) on the uppers stories of a multi-story building may lead to a greater sensitivity in measuring P-waves and S-waves.

In some embodiments, seismic event detection logic may make use of non-inertial information included in a building response signature. In some cases, measurements from an anemometer may be used to estimate the force applied by the wind on a building. By knowing the force applied by the wind some or all of sensed motion in a building signature may be accounted for. In some cases, temperature sensors may be used to provide temperature compensation for other sensors (e.g., strain gauges, or inertial sensors). In some cases, GPS sensors, strain gauges, or camera systems may be used to verify building displacements recorded by inertial sensors. In some cases, a building response signature may include data from inertial sensors that are not connected to a window controller, e.g., inertial sensors may be located in an underground parking garage. In some cases, a building response signature may include information relating to soil conditions underneath or near the building. For example, piezometer measurements may be used by seismic detection logic to determine if the ground surrounding a building is at risk of soil liquefaction. In some cases, a building response signature may include occupancy information which may be used to inform an alert system.

In some embodiments, by having sensors arrayed in both x and y directions, seismic event detection logic may determine the direction of seismic waves. In some cases, seismic event detection logic may determine the hypocenter of a seismic event using triangulation methods. As an example, consider a building with inertial sensors distributed along 50 meters in both x and y directions. Since P-waves generally travel between about 5 and 8 km/s, so long as inertial sensors have a sampling frequency of at least 100 or 200 Hz, the direction of the seismic wave may be determined. When internal sensors have a much higher sampling frequency, e.g., 2 kHz or 4 kHz, the time differential between when a seismic wave is measured at various sensors may be used to determine the seismic hypocenter. In some cases, if the hypocenter of a seismic event is estimated using a measured P-wave, seismic logic may also determine and estimate the arrival of a subsequent S-wave.

In some embodiments, seismic event detection logic may determine if a sensor is malfunctioning or needs to be replaced. For example, seismic event detection logic may determine a sensor is not responding or is providing erratic data by comparing the response of an individual sensor to the rest of a building response signature. When a sensor needs to be replaced, seismic event detection logic may inform a building administrator of the location of the malfunctioning sensor. In some cases, seismic event detection logic may calibrate a sensor, e.g., adjust an offset of a sensor based on the collective inertial data measurements recorded in a building response signature.

In some embodiments, seismic detection logic may be used to check the structural integrity of a building and determine if a seismic retrofit is needed. For example, older buildings may be outfitted with inertial sensors as described herein. If a building response signature corresponding to a non-threatening event indicates a high risk of damage to seismic waves of a certain magnitude or seismic wave propagating from a certain direction, this information may be used by engineers to update the earthquake safety of a building. For example, seismic detection logic may look at the modes of resonance in a building during building movement caused by windstorms and weak seismic waves. Seismic detection logic may aid in determining if a particular building component has failed—e.g., a foundation may no longer be stable, wooden components may be compromised by dry rot, or particular joints may have failed. In some cases, seismic detection logic may be used to identify portions of a building that were not built according to code and/or building plans—for example, if a contractor uses cheaper materials to save cost. Detection of degradation in a building's structural integrity may be accomplished in many ways. In some embodiments, the building's inertial sensor output data generated at defined intervals (e.g., daily at a set time) or over a longer period of time (e.g., continuously) is compared and flagged when significant and consistent deviations are encountered. In some cases, filters are applied to capture only statistically significant deviations. In some embodiments, building response signatures are compared when generated by comparable stimuli (e.g., normal occupancy at 10 am, winds out of the south at 50 mph, etc.). A significant change in the response signature may indicate a degradation in structural integrity.

In some embodiments, seismic event detection logic may be used to inform an active mass damper system when a building experiences lateral loads, as caused by wind or S-waves. For example, seismic detection logic may relay the current motion of the building, provided over a window network, to an active mass damper so that the damping effect is improved. Examples of mass damping systems that may be coupled to seismic detection logic include the vibration control systems produced by TESolution Co., Ltd. of Korea and the active damper system used in the Taipei 101 building, in Taipei, Taiwan.

Installation Examples

Optically switchable windows, window controllers, and/or light sensors with inertial sensors turn buildings into seismic event detection systems. These systems can be implemented in new building designs or used in older buildings where, e.g., a building is located in an area of high earthquake risk. As described elsewhere, such window control systems may also be desired simply to acquire the aesthetic and climate management benefits of optically switchable windows. Windows are typically installed in frames that are anchored to the framing structure of a building. Window controllers are generally attached in the area of a window; however, as discussed elsewhere herein, there is flexibility in where they can be located. Windows may be installed in individual frames, or installed in a curtain wall or similar structure with mullions and transoms separating adjacent windows. All of these components may be considered to form the frame of a window. Typically, though not necessarily, the inertial sensors are affixed to structural elements of the building, regardless of whether the sensors are associated with a window assembly, window controller, or associated with another device on the window network. (e.g., a rooftop light sensor).

Window Controllers and Window Networks Examples

Controllers used to control windows are described in U.S. patent application Ser. No. 15/334,835, filed Oct. 26, 2016, U.S. patent application Ser. No. 14/951,410, filed Jun. 2, 2016, U.S. patent application Ser. No. 13/449,248, filed Apr. 17, 2012, and U.S. patent application Ser. No. 13/449,251, filed Apr. 17, 2012, each of which is incorporated herein by reference in its entirety.

Figure 4:
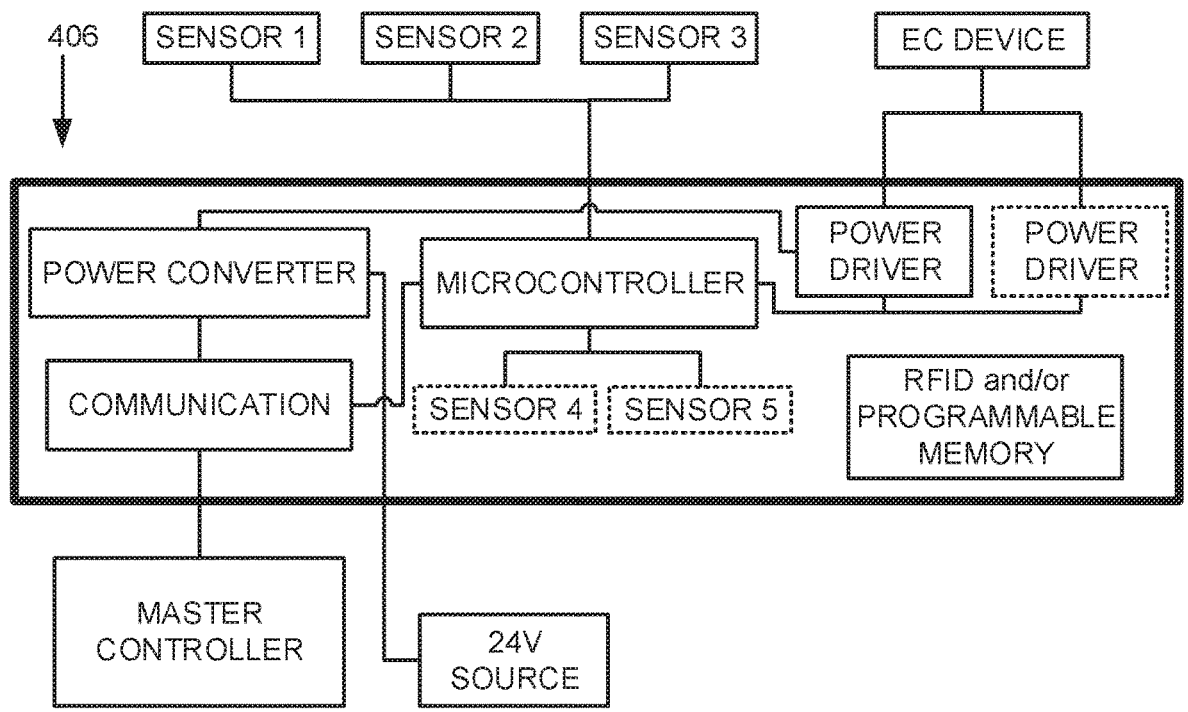
FIG. 4 is a schematic of a window controller.

FIG. 4 depicts an example window controller 406 that may include logic and other features for controlling an optically switchable window. Controller 406 includes a power converter configured to convert a low voltage to the power requirements of an EC device of an EC lite of a window. This power is typically fed to the EC device via a driver circuit (power driver). In one embodiment, controller 406 has a redundant power driver so that in the event one fails, there is a backup, and the controller need not be replaced or repaired.

Controller 406 also includes a communication circuit (labeled "communication" in FIG. 4) for receiving and sending commands to and from a remote controller (depicted in FIG. 4 as "master controller"). The communication circuit also serves to receive and send input to and from a local logic device (e.g., a microcontroller). In one embodiment, the power lines are also used to send and receive communications. The microcontroller includes logic for controlling the at least one EC lite based on, e.g., input received from one or more sensors and/or users. In some embodiments, a window controller may have associated sensors which may be external to the controller (sensors 1-3) or internal, or "onboard" the controller (sensors 4 and 5). These sensors may include inertial sensors that are rigidly connected to the framing structure of the building and other sensors used by a window control system (e.g., photosensors, temperature sensors, occupancy sensors, and the like). In one embodiment, the controller uses the EC device as a sensor, for example, by using current-voltage (I/V) data obtained by sending one or more electrical pulses through the EC device and analyzing the feedback. This type of sensing capability is described in U.S. Pat. No. 9,454,055, naming Brown et al. as inventors, titled "Multipurpose Controller for Multistate Windows," which is incorporated by reference herein in its entirety. A window assembly may also include a PV cell, and the controller may use the PV cell not only to generate power, but also as a photosensor. The microcontroller may also have logic for controlling window antenna functions.

In one embodiment, the controller includes a chip, a card, or a board which includes appropriate logic, programmed and/or hard-coded, for performing one or more control functions. Power and communication functions of controller 406 may be combined in a single chip, for example, a programmable logic device (PLD) chip, field programmable gate array (FPGA) or similar device. Such integrated circuits can combine logic, control and power functions in a single programmable chip. In one embodiment, where the EC window (or window) has two EC panes, the logic is configured to independently control each of the two EC panes. If a window is configured with a window antenna, the logic may also control transmission and/or reception of signals. In one embodiment, the function of each of the two EC panes, and optional window antenna(s) is controlled in a synergistic fashion, that is, so that each device is controlled in order to complement the other. For example, the desired level of light transmission, thermal insulative effect, antenna signal transmission, and/or other property are controlled via a combination of states for each of the individual devices and/or antenna(s). For example, one EC device may have a colored state while the other is used for resistive heating, for example, via a transparent electrode of the device. In another example, the two EC device's colored states are controlled so that the combined transmissivity is the desired outcome.

Controller 406 may also have wireless capabilities, such as control and powering functions. For example, wireless controls, such as RF and/or IR can be used as well as wireless communication such as Bluetooth, Wi-Fi, ZigBee, EnOcean, LiFi (Light Fidelity) and the like to send instructions to the microcontroller and for the microcontroller to send data out to, for example, other window controllers and/or a building management system (BMS). Window antennas may be employed to send and/or receive the control communications and/or power. Various wireless protocols may be used as appropriate. The optimal wireless protocol may depend on how the window is configured to receive power. For instance, if the window is self-powered through a means that produces relatively less power, a communication protocol that uses relatively less power may be used. Similarly, if the window is permanently wired, for example with 24V power, there is less concern about conserving power, and a wireless protocol that requires relatively more power may be used. ZigBee is an example of a protocol that uses relatively more power. Wi-Fi and Bluetooth Low Energy are examples of protocols that use relatively less power. Protocols that use relatively less power may also be beneficial where the window is powered intermittently. LiFi refers to Light Fidelity, which is a bidirectional, high-speed and networked wireless communication technology similar to Wi-Fi. LiFi utilizes a light signal (e.g., visible light, infrared light, near-ultraviolet light, etc.) to convey information wirelessly. The light signal may be too rapid and/or dim for human perception, though such signals can be easily perceived by appropriate receivers. In some cases, the LiFi signal may be generated by one or more light emitting diode (LED), which may be coated with (or otherwise include) a material that allows for high data transmission rates. Example materials may include perovskites. One particular example material is cesium lead bromide ($CsPbBr_3$), which may be provided in nanocrystalline form.

Wireless communication can be used in the window controller for at least one of programming and/or operating the EC window and optionally the window antenna(s), collecting data from the EC window from sensors as well as using the EC window as a relay point for wireless communication. Data collected from EC windows also may include count data such as a number of times an EC device has been activated (cycled), the efficiency of the EC device over time, and the like. Each of these wireless communication features is described in U.S. Pat. No. 9,454,055, naming Brown et al. as inventors, titled "Multipurpose Controller for Multistate Windows," previously incorporated by reference above.

In certain embodiments, light is used to communicate with and/or power a window/antenna controller. That is, light generated at a distance by, for example, a diode laser transmits power and/or control signals to a window controller via an appropriate light transmission medium such as a fiber optic cable or free space. Examples of suitable photonic transmission methods for window controllers are described in PCT Application No. PCT/US13/56506, filed Aug. 23, 2013, and titled "PHOTONIC-POWERED EC DEVICES," which is herein incorporated by reference in its entirety. In a particular embodiment, power is provided through photonic methods, while communication is provided via one or more window antennas patterned onto a lite of an electrochromic window or an associated window component. In another embodiment, power is provided through photonic methods, while communication is provided via Wi-Fi or another wireless communication method using antennas.

Returning to the embodiment of FIG. 4, controller 406 may also include a RFID tag and/or memory such as solid state serial memory (e.g., I2C or SPI) which may optionally be a programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

Most RFID tags contain at least two parts. One is an integrated circuit for storing and processing information, modulating and demodulating a radio-frequency (RF) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range.

In one embodiment, the RFID tag or other memory is programmed with at least one of the following types of data: warranty information, installation information (e.g., absolute and relative position and orientation of the window), vendor information, batch/inventory information, EC device/IGU characteristics, EC device cycling information, inertial sensor information, and customer information. Examples of information that may be passed upstream from a window controller, a BMS, or another device include the window voltage ($V_W$), window current ($I_W$), EC coating temperature ($T_{EC}$), glass visible transmission (% $T_{vis}$), % tint command (external analog input from BMS), digital input states, inertial measurements, and controller status. The window voltage, window current, window temperature, and/or visible transmission level may be detected directly from sensors on the windows. The % tint command may be provided to the BMS or other building device indicating that the controller has in fact taken action to implement a tint change, which change may have been requested by the building device. This can be important because other building systems such as HVAC systems might not recognize that a tint action is being taken, as a window may require a few minutes (e.g., 10 minutes) to change state after a tint action is initiated. Thus, an HVAC action may be deferred for an appropriate period of time to ensure that the tinting action has sufficient time to impact the building environment. The digital input states information may tell a BMS or other system that a manual action relevant to the smart window/antenna has been taken. As described elsewhere, inertial measurements may be collected as a building response signature and passed to seismic event detection logic. Finally, the controller status may inform the BMS or other system that the controller in question is operational, or not, or has some other status relevant to its overall functioning.

Examples of downstream data from a BMS or other building system that may be provided to the controller include window drive configuration parameters, zone membership (e.g. what zone within the building is this controller part of), % tint value, digital output states, and digital control (tint, bleach, auto, reboot, etc.). The window drive parameters may define a control sequence (effectively an algorithm) for changing a window state. Examples of window drive configuration parameters include bleach to color transition ramp rate, bleach to color transition voltage, initial coloration ramp rate, initial coloration voltage, initial coloration current limit, coloration hold voltage, coloration hold current limit, color to bleach transition ramp rate, color to bleach transition voltage, initial bleach ramp rate, initial bleach voltage, initial bleach current limit, bleach hold voltage, bleach hold current limit. Examples of the application of such window drive parameters are presented in U.S. patent application Ser. No. 13/049,623 (issued as U.S. Pat. No. 8,254,013), filed Mar. 16, 2011, and titled "CONTROLLING TRANSITIONS IN OPTICALLY SWITCHABLE DEVICES," and U.S. patent application Ser. No. 13/449,251, filed Apr. 17, 2012, and titled "CONTROLLER FOR OPTICALLY-SWITCHABLE WINDOWS," both of which are incorporated herein by reference in their entireties.

In one or more aspects, one or more of the functions described may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for optically switchable windows can be more generally implemented as or for switchable optical devices (including windows, mirrors, etc.).

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for detecting seismic waves, the system comprising:
   two or more buildings, each comprising a plurality of optically switchable windows;
   a plurality of window controllers, each configured to control the optical state of at least one of the plurality of optically switchable windows, wherein the plurality of window controllers are connected via a network;
   a plurality of inertial sensors communicatively coupled with the network, each configured to measure inertial data in at least one direction when affixed to a respective one of the two or more buildings and to provide the measured inertial data to the network; and
   seismic event detection logic, operating on a distributed computing platform comprising at least one of the plurality of window controllers, and configured to (i) identify or receive building response signatures, wherein the building response signatures comprise the measured inertial data from the plurality of inertial sensors and (ii) analyze the building response signatures to determine that a seismic event has occurred.

2. The system of claim 1, wherein the response signature of at least one of the two or more buildings further comprises location data for the plurality of inertial sensors.

3. The system of claim 1, wherein at least one of the plurality of inertial sensors is located within a mullion of one of the plurality of optically switchable windows.

4. The system of claim 1, wherein at least one of the plurality of inertial sensors is located within a housing for a light sensor, wherein the light sensor is connected with the network and configured to provide lighting information to the network for controlling the plurality of optically switchable windows.

5. The system of claim 1, wherein at least one of the plurality of inertial sensors comprises an accelerometer or a gyroscope.

6. The system of claim 5, wherein the accelerometer or the gyroscope has a sensitivity greater than about 0.5 V/g.

7. The system of claim 5, wherein the accelerometer or gyroscope has a sampling frequency greater than about 1 kHz.

8. The system of claim 1, further comprising one or more additional sensors selected from the group consisting of a strain gauge, an anemometer, a temperature sensor, a piezometer, a GPS sensor, and a camera, wherein the one or more additional sensors provide additional data to the network, and wherein the response signature of at least one of the two or more buildings comprises the additional data.

9. The system of claim 1, wherein at least one of the plurality of inertial sensors is configured to provide inertial data to the network via a wireless connection to at least one of the plurality of window controllers.

10. The system of claim 1, wherein the network is further configured to deliver power to the plurality of window controllers and the plurality of inertial sensors.

11. The system of claim 1, wherein the seismic event detection logic is further configured to determine that the response signature of at least one of the two or more buildings corresponds to a P-wave.

12. The system of claim 11, wherein the seismic event detection logic is further configured to determine a seismic hypocenter of the P-wave.

13. The system of claim 11, wherein the seismic event detection logic is further configured to estimate an arrival of a corresponding S-wave.

14. The system of claim 11, wherein the seismic event detection logic is further configured to trigger an alert after determining that the response signature of at least one of the two or more buildings corresponds to a P-wave, wherein triggering the alert includes one or more of providing audible or visual alerts to building occupants, unlocking doors, closing gas lines, and closing water lines.

15. The system of claim 1, wherein the seismic event detection logic is further configured to determine that one or more of the plurality of inertial sensors is not functioning properly.

16. The system of claiml, wherein the seismic event detection logic is executed on a cloud computing platform in communication with the network.

17. The system of claim 1, wherein the seismic event detection logic is further configured to send control signals to the optically switchable windows to: clear all the windows, clear only windows where occupants are detected while other windows remain tinted, or tint windows to prevent heat gain on one or more sides of a building when a cooling system is shut down, impaired, or expected to be impaired due to loss of power or malfunction/damage from a seismic event.

18. The system of claim 1, wherein the seismic event detection logic is configured to report to or receive data from an external earthquake event detection network.

19. The system of claim 1, wherein the seismic event detection logic is configured to analyze the response signature of at least one of the two or more buildings using a seismic model.

20. The system of claim 19, wherein the seismic event detection logic is further configured to detect a structural change in at least one of the building two or more buildings.

21. The system of claim 20, wherein the seismic event detection logic is further configured to determine whether the structural change creates a safety threat.

22. The system of claim 21, wherein determining that the structural change creates a safety threat triggers one or more of providing audible or visual alerts to building occupants, unlocking doors, closing gas lines, and closing water lines.

23. A method for detecting seismic events, the method comprising:
   installing a respective window control system in each of two or more buildings, the window control system comprising:
   a plurality of optically switchable windows,
   a plurality of window controllers, wherein each window controller is configured to control the optical state of at least one of the plurality of optically switchable windows, and wherein the plurality of window controllers are connected by a network, and
   a plurality of inertial sensors communicatively coupled with the network and distributed in at least two dimensions in the building, wherein each of the plurality of inertial sensors is configured to measure inertial data in at least one direction, and wherein the plurality of inertial sensors is further configured to provide inertial data to the network;
   identifying a building response signature, wherein the building response signature comprises the inertial data provided to the network; and
   determining that a seismic event has occurred by analyzing, using a seismic event detection logic operating on a distributed computing platform that comprises at least one of the plurality of window controllers, the seismic event detection logic being configured to (i) identify or receive building response signatures from the two or more buildings, wherein the building response signatures comprise the measured inertial data from the plurality of inertial sensors and (ii) analyze the building response signatures to determine that a seismic event has occurred.

24. The method of claim 23, wherein the building response signature comprises location data for the plurality of inertial sensors.

25. The method of claim 23, wherein at least one inertial sensor includes an accelerometer or gyroscope.

26. The method of claim 23, further comprising installing one or more additional sensors in at least one of the one or more buildings, the one or more additional sensors selected from the group consisting of a strain gauge, an anemometer, a temperature sensor, a piezometer, a GPS sensor, and a camera, wherein the one or more additional sensors provide additional data to the network.

27. The method of claim 23, wherein detecting that a seismic event has occurred comprises detecting a P-wave when analyzing the response signature of at least one of the two or more buildings using the seismic detection logic.

28. The method of claim 23, further comprising detecting a structural change in at least one of the two or more buildings.

* * * * *